(12) United States Patent
Mabuchi (10) Patent No.: US 7,990,436 B2
(45) Date of Patent: Aug. 2, 2011

(54) SOLID STATE IMAGE PICKUP DEVICE, DRIVE METHOD THEREOF AND CAMERA SYSTEM

(75) Inventor: Keiji Mabuchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 378 days.

(21) Appl. No.: 12/257,473

(22) Filed: Oct. 24, 2008

(65) Prior Publication Data

US 2009/0109311 A1 Apr. 30, 2009

(30) Foreign Application Priority Data

Oct. 30, 2007 (JP) .................................. 2007-281368

(51) Int. Cl.
*H04N 5/76* (2006.01)
*H04N 5/335* (2006.01)
*H01L 27/00* (2006.01)
*H01L 31/113* (2006.01)

(52) U.S. Cl. ................ 348/231.99; 348/308; 348/231.3; 348/231.6; 348/302; 250/208.1; 257/291

(58) Field of Classification Search .................. 348/294, 348/302–308, 231.99, 231.1, 231.3, 231.6; 250/208.1, 214.1, 214 R; 257/291–294
See application file for complete search history.

(56) References Cited

U.S. PATENT DOCUMENTS 6,870,565 B1 3/2005 Blerkom et al.

FOREIGN PATENT DOCUMENTS

| JP | 7-123333 A | 5/1995 |
| JP | 2005-328326 A | 11/2005 |
| JP | 2006-237772 | 9/2006 |
| JP | 2007-251680 A | 9/2007 |
| WO | 2006/137951 A1 | 12/2006 |

OTHER PUBLICATIONS

Japanese Patent Office, Office Action issued in Patent Application JP2007-281368, on Sep. 1, 2009.

*Primary Examiner* — Lin Ye
*Assistant Examiner* — Marly Camargo
(74) *Attorney, Agent, or Firm* — SNR Denton US LLP (57) ABSTRACT

A solid state image pickup device which includes a pixel unit having a plurality of pixels arranged in a two-dimensional matrix shape and having a mechanism for converting an optical signal into an electrical signal and outputting the resultant signal, a column processing circuit for performing column processing of the signal from the pixel unit, a calculating circuit for calculating a processing result of the column processing circuit, a frame memory unit, an internal interface for connecting the calculating circuit and the frame memory unit, an external interface for connecting an external unit or device and the frame memory unit, and a connection switching circuit for switching a connection of the frame memory unit relative to the internal interface and the external interface.

9 Claims, 12 Drawing Sheets

SOLID STATE IMAGE PICKUP DEVICE, DRIVE METHOD THEREOF AND CAMERA SYSTEM

CROSS-REFERENCE TO RELATED APPLICATIONS

The present document contains subject matter related to Japanese Patent Application No. 2007-281368 filed in the Japanese Patent Office on Oct. 30, 2007, the entire content of which being incorporated herein by reference.

BACKGROUND OF THE INVENTION

1. Field of the Invention

The present invention relates to a solid state image pickup device represented by a CMOS image sensor, drive method thereof and a camera system.

2. Description of Related Art

In recent years, a CMOS image sensor has been paid attention as a solid state image pickup device (image sensor) to be substituted for CCD.

This is because the CMOS image sensor overcomes various problems of CCD, such as very complicated system caused by the necessity of dedicated processes for manufacturing CCD pixels, the necessity of a plurality of power source voltages for operation, and the necessity to operate by combining a plurality of peripheral IC's.

A CMOS image sensor has a plurality of large merits: manufacturing processes similar to those for a typical CMOS type integrated circuit can be used for manufacturing CMOS image sensors, a single power source can drive a CMOS image sensor, and the number of peripheral IC's can be reduced because analog circuits and logic circuits manufactured by CMOS processes can be mixed on the same chip.

A mainstream of a CCD output circuit is a one channel (1-ch) output using a floating diffusion (FD) amplifier having an FD layer.

In contrast, a mainstream of a CMOS image sensor is a column parallel output type in which each pixel is provided with an FD amplifier, and by selecting each row of a pixel array, outputs of FD amplifiers are read in a column direction at the same time.

It is difficult to obtain sufficient drive ability by an FD amplifier disposed in each pixel, therefore a data rate is required to be lowered. In this context, it is considered that parallel processing is advantageous.

As a CMOS image sensor having this configuration, an image sensor which adds a plurality of consecutive images, stores the added images in a frame memory and outputs a single final image has been proposed (refer to Patent Document 1: Japanese Unexamined Patent Application Publication No. 2006-237772).

Figure 1:
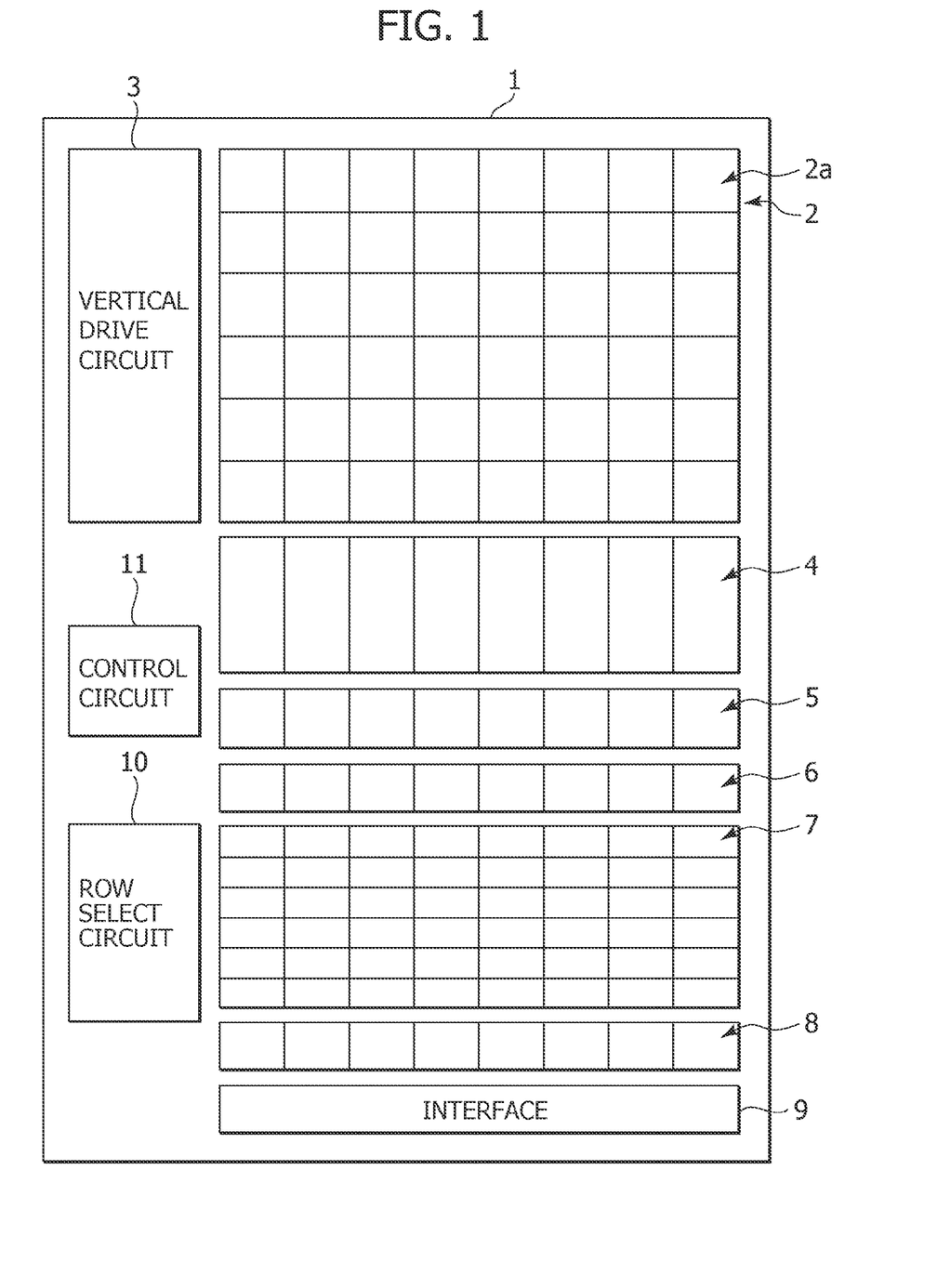
FIG. 1 is a diagram showing the structure of an image sensor described in Patent Document 1.

FIG. 1 is a diagram showing the structure of an image sensor described in the Patent Document 1.

As shown in FIG. 1, the image sensor 1 includes a pixel portion 2 having pixels 2a arranged in an array shape, a vertical drive circuit 3, an analog/digital (A/D) conversion circuit 4 as a column signal processing circuit, an adder circuit 5, a first sense amplifier 6, a frame memory 7, a second sense amplifier 8, an interface 9, a row select circuit 10 and a control circuit 11.

In the image sensor 1, the vertical drive circuit 3 scans the pixel portion 2, for example, four times. Outputs from the pixel portion 2 are supplied via the AD conversion circuit 4 to the adder circuit 5 which adds the outputs to values read from the frame memory 7 and writes back the addition result to the frame memory 7.

These operations are performed on a column parallel way. In this case, if addition is performed by shifting an origin so as to cancel out detected hand shaking, hand shaking correction is realized.

Further, if weighted addition is performed by changing a storage time of a plurality of scans, a dynamic range expanding operation is realized. If one image is synthesized from four images and outputted, a data amount at an upstream of a camera system can be reduced by about a quarter.

Figure 2:
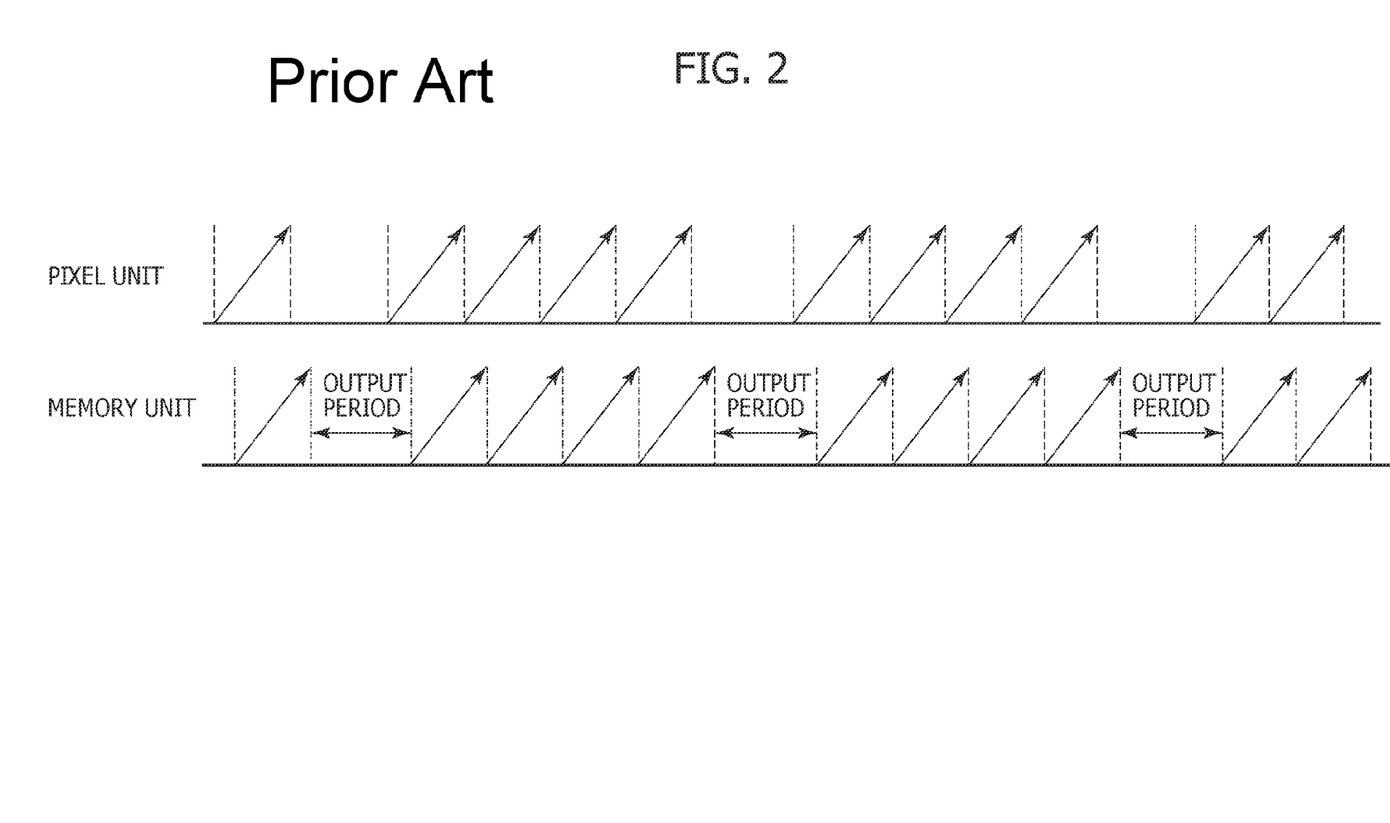
FIG. 2 is a diagram illustrating an operation of the image sensor shown in FIG. 1 while an image is moved.

FIG. 2 is a diagram illustrating the operation of the image sensor shown in FIG. 1 while an image is moved.

In the case of moving image, the vertical drive circuit 3 scans the pixel area 2 four times and the row select circuit 10 scans the frame memory 7 four times, whereby one image is formed in the frame memory 7. A timing delay between scans of the pixel portion 2 and a memory portion is a timing delay of time required for AD conversion and calculations. The formed image is then outputted. These operations are repeated.

SUMMARY OF THE INVENTION

Although the data amount at the upstream is reduced by about a quarter, data is required to be outputted at high speed. It is difficult for a reception side to process in real time at this speed.

Irrespective of data reduction by a quarter, it is necessary to prepare the interface 9 capable of operating at high speed.

Until data is outputted from the memory, new image cannot be read from the pixel side, and thus operation is restricted.

The present invention provides a solid state image pickup device capable of setting a data output rate at low speed, using a low speed interface, and executing moving image processing in real time without any operation limit, a drive method for the solid state image pickup device and a camera system.

According to a first aspect of the present invention, there is provided a solid state image pickup device includes a pixel unit having a plurality of pixels arranged in a two-dimensional matrix shape and having a mechanism for converting an optical signal into an electrical signal and outputting the electrical signal, a column processing circuit for performing column processing for the signal outputted from the pixel unit, a calculating circuit for calculating a processing result of the column processing circuit, a frame memory unit, an internal interface for connecting the calculating circuit and the frame memory unit, an external interface for connecting an external unit or device and the frame memory unit, and a connection switching circuit for switching a connection of the frame memory unit with the internal interface and the external interface.

Preferably, the column processing circuit includes an analog/digital (AD) conversion circuit for converting an analog signal into a digital signal.

Preferably, the frame memory unit is divided into a plurality of areas, and the solid state image pickup device further includes a control unit for controlling in such a way that while the pixel unit is scanned a plurality of times, image data having a reduced data size is recorded in a first area of the frame memory unit via the internal interface, and during the time period, data in another area of the frame memory unit is outputted via the external interface, and after completion of scan by the plurality of times, similar scan operations are repeated by connecting a second area different from the first area of the frame memory unit to the internal interface and connecting an area other than the second area to the external interface.

Preferably, the AD conversion circuit and the calculation circuit are arranged at a plurality of columns, and parallel processing is performed on a row unit basis synchronously with scanning of the pixel unit.

Preferably, the solid state image pickup device further includes an address circuit per each frame memory unit connected to the internal interface.

Preferably, the solid state image pickup device further includes an input/output circuit per each frame memory unit.

Preferably, the calculation circuit calculates a signal read from the frame memory unit and a signal outputted from the AD conversion circuit, and a calculation result is again written in the frame memory unit.

Preferably, the pixel unit and the frame memory unit are formed on different semiconductor substrates, and the semiconductor substrates are connected in column parallel by a number of connection units.

Preferably, the connection units are disposed at a stage after the AD conversion circuit and before the internal interface.

Preferably, the control unit has a function of outputting a signal which notice switching of connections to external in advance.

According to a second aspect of the present invention, there is provided a solid state image pickup device which includes a pixel unit having a plurality of pixels arranged in a two-dimensional matrix shape and having a mechanism for converting an optical signal into an electrical signal and outputting the electrical signal, and a frame memory unit. While an image data forming area of the frame memory is shifted, an operation is repeated in which while the pixel unit is scanned a plurality of times, image data is formed in a partial area of the frame memory, and during the time period, image data previously formed is outputted from another area of the frame memory.

According to a third aspect of the present invention, there is provided a drive method for a solid state image pickup device, the solid state image pickup device including a pixel unit having a plurality of pixels arranged in a two-dimensional matrix shape and having a mechanism for converting an optical signal into an electrical signal and accumulating the electrical signal in accordance with exposure times, a column processing circuit for performing column processing of the signal from the pixel unit, a calculating circuit for calculating a processing result of the column processing circuit, a frame memory unit, an internal interface for connecting the calculating circuit and the frame memory unit, an external interface for connecting an external unit or device and the frame memory unit, and a connection switching circuit for switching a connection among the frame memory unit, the internal interface, and the external interface. In the drive method for the solid state image pickup device, the frame memory unit is divided into a plurality of areas, and while the pixel unit is scanned a plurality of times, image data having a reduced data size is recorded in a first area of the frame memory unit via the internal interface, and during the time period, data in another area of the frame memory unit is outputted via the external interface, and after scan by the plurality of times are complied, similar operations accompanied by the scanning are repeated by connecting a second area different from the first area of the frame memory unit to the internal interface and connecting an area other than the second area to the external interface.

According to a fourth aspect of the present invention, there is provided a camera system including a solid state image pickup device, an optical system for forming an object image on the solid state image pickup device, and a signal processing circuit for processing an output image signal from the solid state image pickup device. The solid state image pickup devices includes a pixel unit having a plurality of pixels arranged in a two-dimensional matrix shape and having a mechanism for converting an optical signal into an electrical signal and accumulating the electrical signal in accordance with exposure times, a column processing circuit for performing column processing for the signal from the pixel unit, a calculating circuit for calculating a processing result by the column processing circuit, a frame memory unit, an internal interface for connecting the calculating circuit and the frame memory unit, an external interface for connecting an external unit or device and the frame memory unit, and a connection switching circuit for switching a connection among the frame memory unit, the internal interface, and the external interface.

According to embodiments of the present invention, while the pixel unit is scanned a plurality of times, image data having a reduced data size is recorded in the first area of the frame memory unit via the internal interface. During this time period, in parallel, data is outputted from another area of the frame memory unit via the external interface.

After scan of a plurality of times is completed, similar operations accompanied by the scanning are repeated by connecting a second area different from a first area of the frame memory unit is connected to the internal interface and by connecting an area other than the second area to the external interface.

According to embodiments of the present invention, a data output rate can be lowered in speed and a low speed interface can be used. It is possible to realize real time processing while the operation is not restricted in the moving image processing.

DETAILED DESCRIPTION OF THE EMBODIMENTS

Embodiments of the present invention will be described with reference to the accompanying drawings.

Figure 3:
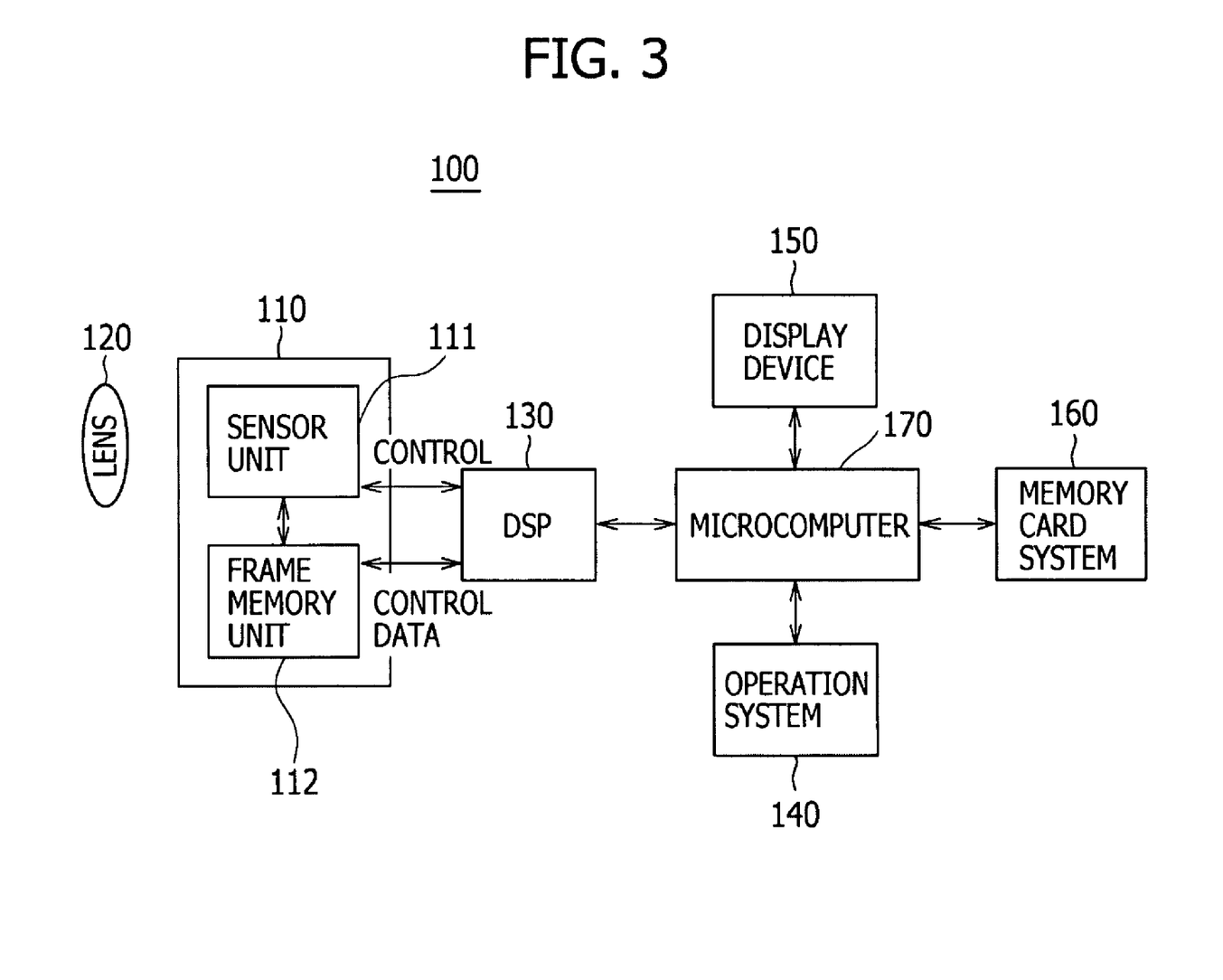
FIG. 3 is a diagram showing an example of the basic structure of a camera system according to an embodiment of the present invention.

FIG. 3 is a diagram showing an example of the basic structure of a camera system according to an embodiment of the present invention.

As shown in FIG. 3, the camera system 100 includes an imaging device 110 constituted of a sensor unit 111 capable of adopting a CMOS image sensor (solid state image pickup device) of an embodiment and a frame memory unit 112, an optical system for guiding incidence light (for forming an object image) to a pixel area of the imaging device 110, e.g., a lens 120 for forming image of incidence light (image light) on an imaging plane, a digital signal processing (DSP) circuit 130 for performing access control and operation control of the sensor unit 111 and frame memory unit 112 and digitally processing an output signal, an operation system 140 including switches for instructing a camera operation, a display device 150 for displaying a captured image, a monitor image and the like, a memory card system 160 for storing an image or the like, and a microcomputer 170 for performing a transmission/reception operation of a signal of DSP 130, a control processing in response to an operation of the operation system 140, a control operation for the display device 150, an access control to the memory card system 160 and other operations.

Basically, the sensor unit 111 stores once its output in the frame memory unit 112. DSP 130 as the digital signal processing circuit controls the CMOS sensor unit 111 and frame memory unit 112, and receives a signal of the CMOS sensor unit 111 from the frame memory unit 112 to perform color processing, image correction, compression and the like.

As viewed from DSP 130, the system constituted of the CMOS sensor unit 111 and frame memory unit 112 functions as the solid state image pickup device.

Image signals processed by DSP 130 and microcomputer 170 are recorded in a recording medium, such as a memory card, and displayed as a moving image on the display device 150 such as a liquid crystal display.

Figure 4:
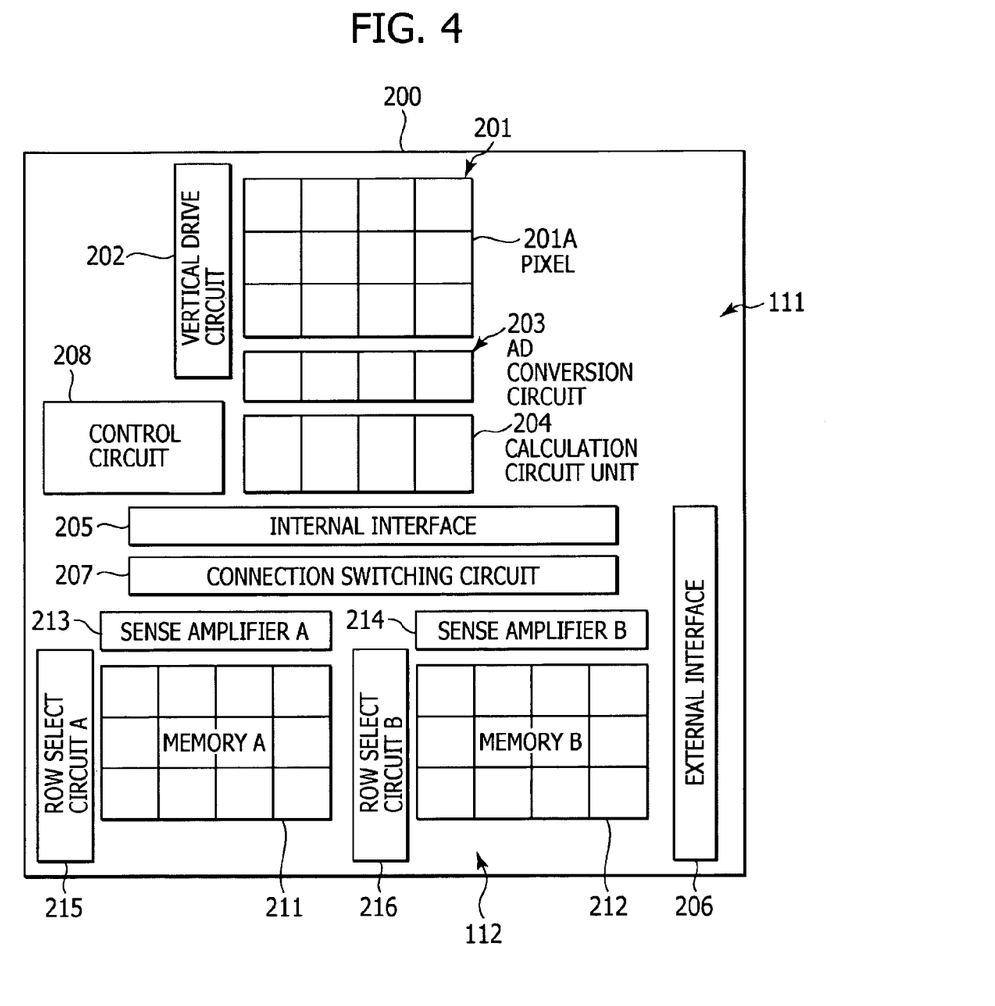
FIG. 4 is a diagram showing an example of the basic structure of a CMOS image sensor (solid state image pickup device) according to an embodiment of the present invention.

FIG. 4 is a diagram showing the basic structure of a CMOS image sensor (solid state image pickup device) according to an embodiment of the present invention.

A CMOS Image sensor (corresponding to the imaging device 110 shown in FIG. 3) 200 shown in FIG. 4 shows an example of the structure in which the CMOS sensor unit 111 and frame memory unit 112 of FIG. 3 are integrated on a single semiconductor substrate.

The CMOS sensor unit 111 of the CMOS image sensor 200 includes a pixel unit 201 having a plurality of pixels 201A arranged in a two-dimensional matrix shape and having a mechanism of converting for example, an optical signal into an electrical signal and accumulating electric signals in accordance with an exposure time, a vertical drive circuit 202 for scanning the pixel unit 201, an AD conversion circuit 203 as a column signal processing circuit for AD converting a signal from the pixel unit 201, a calculation circuit 204 for calculating AD conversion results, an internal interface 205 for connecting the frame memory unit 112 and calculation circuit 204, an external interface 206 for connecting an external unit or device (such as a digital signal processor a/k/a DSP) and frame memory unit 112, a connection switching circuit 207 for performing connection switching between the internal interface 205 and external interface 206, and the frame memory unit 112, and a control circuit 208 for controlling the whole.

The frame memory unit 112 is divided into a plurality of areas, in the example shown in FIG. 4, two areas: a first frame memory area (A) 211 and a second frame memory area (B) 212.

In correspondence with the first frame memory area 211 and second frame memory area 212, there are provided sense amplifiers (A) 213 and (B) 214 and row select circuits (A) 215 and (B) 216, respectively.

The pixel unit 101 has, as described above, a plurality of pixels 201A arranged in a two-dimensional shape (in a matrix shape).

Figure 5:
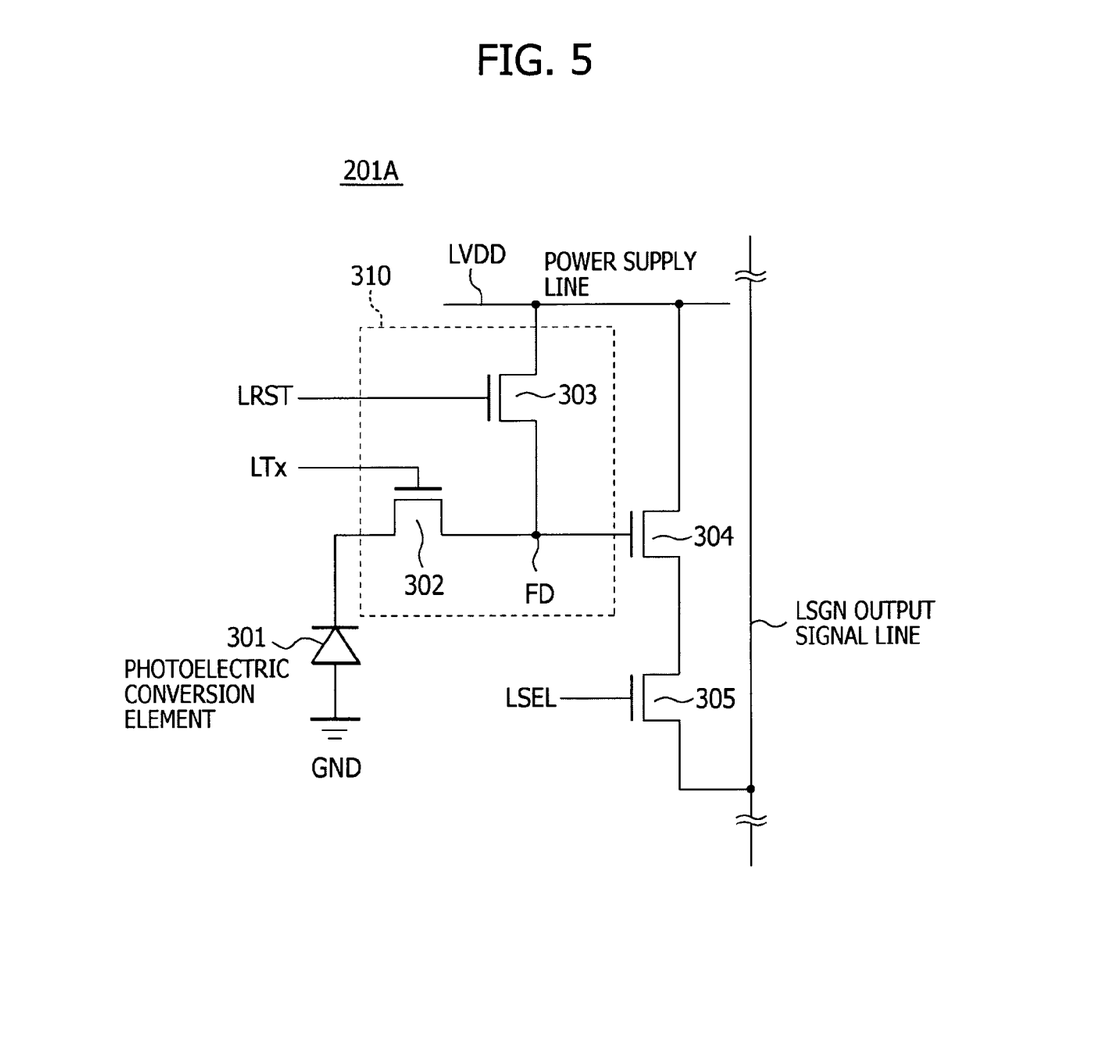
FIG. 5 is a diagram showing an example of a pixel of a CMOS image sensor constituted of four transistors according to an embodiment.

FIG. 5 is a diagram showing an example of a pixel of the CMOS image sensor constituted of four transistors according to an embodiment.

Each pixel 201A has one photoelectric conversion element 301 constituted of a photodiode, and four transistors including a transfer transistor 302, a reset transistor 303, an amplifier transistor 304 and a select transistor 305 as active elements with respect to the single photoelectric conversion element 301.

In this embodiment, out of the four active elements, the transfer transistor 302 and reset transistor 303 constitute a reset circuit 310.

Namely, in this embodiment, turning on the transfer transistor 302 and reset transistor 303 corresponds to resetting an image in the present invention in a broad sense, and both or either one of a control signal Tx for on/off control the transfer transistor 302 and a control signal RST for on/off control the reset transistor 303 corresponds to a signal for resetting a pixel in the present invention in a broad sense.

The photoelectric conversion element 301 photoelectrically converts incidence light into charges (in this example, electrons) corresponding in amount to an incidence light amount.

The transfer transistor 302 is connected between the photoelectric conversion element 301 and a floating diffusion FD, and upon supply of the control signal Tx to its gate (transfer gate) via a transfer control line LTx, transfers electrons photoelectrically converted by the photoelectric conversion element 301 to the floating diffusion FD.

The reset transistor 303 is connected between a power supply line LVDD and floating diffusion FD, and upon supply of the control signal RST to its gate via a reset control line LRST, resets a potential of the floating diffusion FD to a potential of the power supply line LVDD.

A gate of the amplifier transistor 304 is connected to the floating diffusion FD. The amplifier transistor 304 is connected via the select transistor 305 to a signal line LSGN, and constitutes a source follower together with a constant current source outside the pixel unit.

As a control signal (address signal or select signal) SEL is supplied to the gate of the select transistor 305 via a select control line LSEL and when the select transistor 305 is turned on, the amplifier transistor 304 outputs a voltage corresponding to a potential of the floating diffusion FD to the signal line LSGN. The voltage outputted from each pixel is outputted to the AD conversion circuit 203 as the column signal processing circuit via the signal line LSGN.

These operations are performed for each pixel of one row simultaneously because, for example, each gate of the transfer transistor 302, reset transistor 303 and select transistor 305 are connected on the row unit basis.

A set of the reset control line LRST, transfer control line LTx and select control line LSEL wired in the pixel unit 201 is wired on a row unit basis in the pixel array.

The reset control line LRST, transfer control line LTx and select control line LSEL are driven by the vertical drive circuit 202.

The vertical drive circuit 202 scans the pixel unit 201 and makes a signal outputted to the signal line LSGN. A signal of the pixel unit 201 is AD converted by the AD conversion circuit 203 and sent to the calculation circuit 204.

The calculation circuit 204 adjusts a black level of an input signal, calculates a signal read from the frame memory unit 112, and writes back the results to the frame memory unit 112.

As described above, the frame memory unit 112 has the first frame memory area (A) 211 and second frame memory area (B) 212 and corresponding sense amplifiers 213 and 214 and row select circuits 215 and 216, respectively.

The connection switching circuit 207 switches connection between the internal interface 205 and external interface 206 relative to the sense amplifiers 213 and 214.

The internal interface 205 is an interface between the calculation circuit 204 and frame memory unit 112, and the external interface 206 is an interface between the system and an external.

The control circuit 208 controls the operation. Both the AD conversion circuit 203 and calculation circuit 204 process pixels of one row at the same time by corresponding to respective columns of pixels. Generally, a circuit portion shared by a plurality of columns may exist. Namely, AD conversion may be shared by two columns and instead an AD conversion operation may be performed twice.

Figure 6:
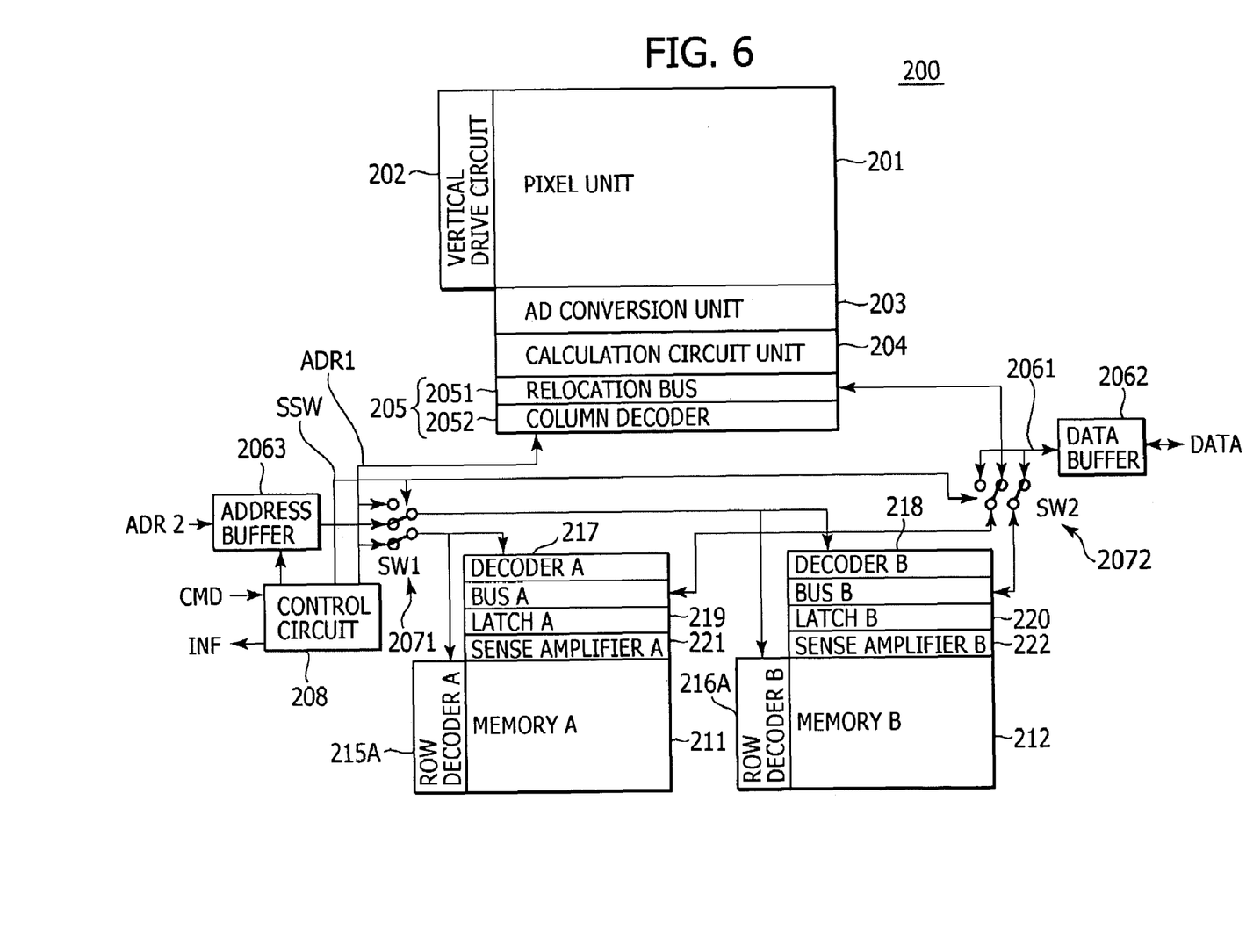
FIG. 6 is a diagram showing an example of a more specific structure of the CMOS image sensor (solid state image pickup device) shown in FIG. 4.

FIG. 6 is a diagram showing an example of a more specific structure of the CMOS image sensor (solid state image pickup device) shown in FIG. 4.

In FIG. 6, the internal interface 205 has a relocation bus 2051 and a column decoder 2052.

The external interface 206 has an input/output bus 2061, a data buffer 2062 and an address buffer 2063.

The connection switching circuit 207 has two switching units 2071 and 2072. The switching units 2071 and 2072 have switches SW1 and SW2, respectively.

The control circuit 208 send to the switches SW1 and SW2 a connection switching signal SSW indicating which of the first frame memory area (A) 211 and second frame memory area (B) 212 is connected to the internal interface 205 and which of them is connected to the external interface 206.

The first frame memory area (A) 211 and second frame memory area (B) 212 have, in addition to the structure shown in FIG. 4, decoders (A) 217 and (B) 218, bus (A) 219 and (B) 220 and latches (A) 221 and (B) 222, respectively.

In the example shown in FIG. 6, the first frame memory area (A) 211 is connected to the internal interface 205, whereas the second frame memory area (B) 212 is connected to the external interface 206.

In the first frame memory area (A) 211, the decoder (A) 217 receives an address ADR1 generated by the control circuit 208, and a signal is exchanged with the bus (A) 219 via the latch (A) 221.

The column decoder 2052 on the pixel side receives the address ADR1 generated by the control circuit 208, and a signal is transferred to/from the relocation bus 2051.

Since the bus (A) 219 and relocation bus 2051 are connected by the switch SW2 of the connection switching circuit 207, data is transferred between the calculation circuit 204 and first frame memory area (A) 211 in accordance with an instruction from the control circuit 208.

In this case, if addition is performed by shifting the origin, hand shaking correction can be realized, and if weighted addition is performed, dynamic range expanding process can be realized.

The second frame memory area (B) 212 operates after receiving an address ADR2 inputted from an external unit or device. The second frame memory area (B) 212 transfer data to/from the external via because the bus (B) 220 and the input/output bus 2061 of the external interface 206 connected by the switch SW2 of the connection switching circuit 207.

An operation of automatically and sequentially outputting data without receiving the address may also be performed.

The memory seems to have only one area as viewed from the external, but it seems that the contents of the memory are rewritten at the moment the switches SW1 and SW2 are switched.

If a connection switching signal SSW is outputted to an external unit or device, it is possible to judge from the external which memory is referred. It is, however, preferable to output a signal notice in advance that a signal will be switched before switching, e.g., before several clocks to several tens of clocks.

Figure 7:
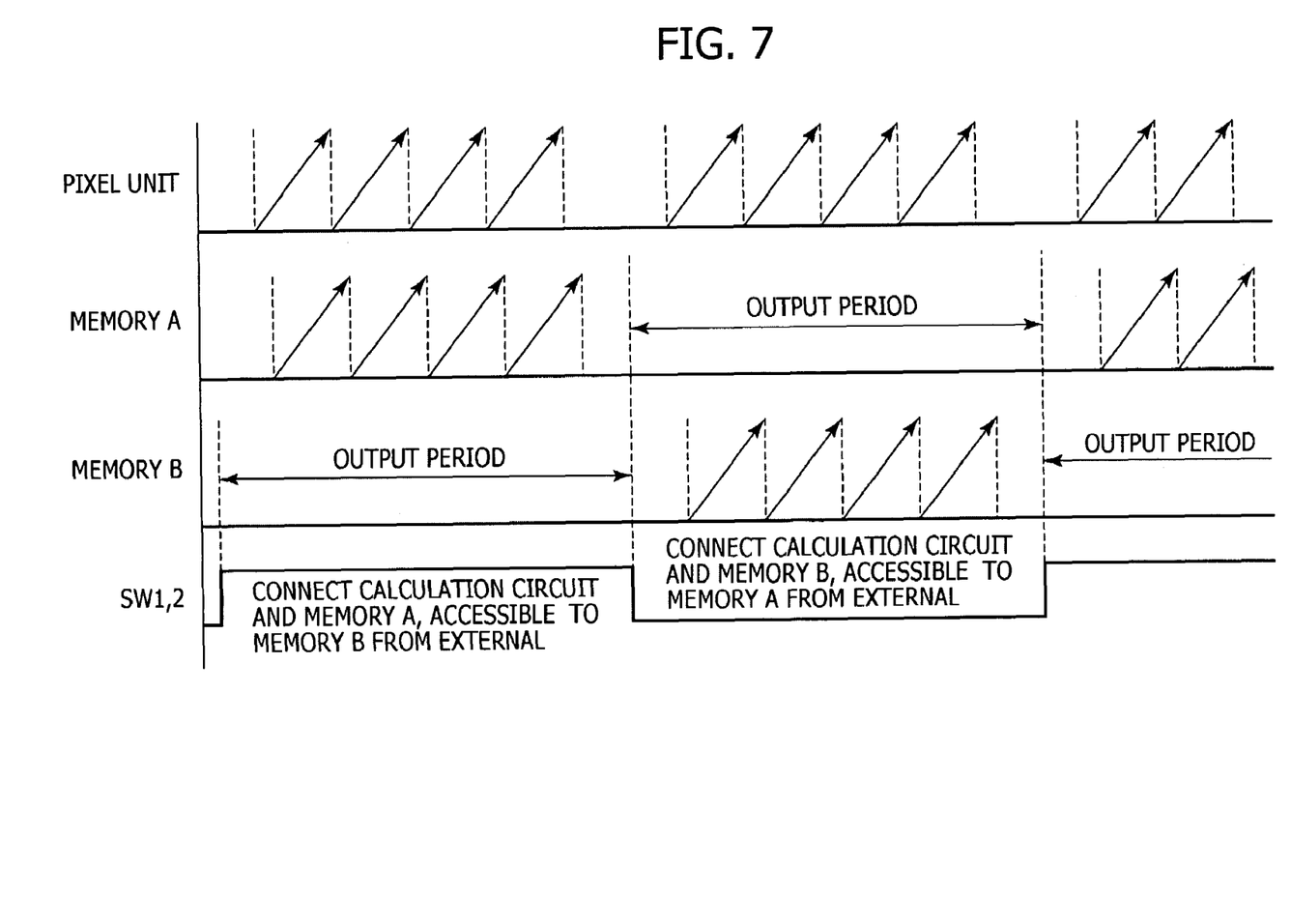
FIG. 7 is a diagram illustrating a scan operation of the CMOS image sensor shown in FIGS. 4 and 6.

FIG. 7 is a diagram illustrating a scan operation of the CMOS image sensor shown in FIGS. 4 and 6.

The pixel unit 201 is scanned four times, and the frame memory unit 112 is scanned four times correspondingly. After completion of this scan, the switches SW1 and SW2 of the connection switching circuit 207 are switched.

While the image data is generated in the first frame memory area (A) 211 by signals from the pixel unit 201, the second frame memory area (B) 212 can be accessed from the external.

Thus, a data rate for the CMOS sensor shown in FIG. 1 may be lowered.

A period between scans A and scans B can be shortened to "0" if necessary, based on assumption that the scan A is a scan of the pixel unit 201 for storing (forming) data in the first frame memory area (A) 211 and the scan B is a scan of the pixel unit 201 for storing (forming) data in the second frame memory area (B) 212.

Since the period while the memory can be accessed from the external is long, not only image data is outputted from the memory, but also thereafter the memory may be used by writing data from the external.

The scan method is not limited to that shown in FIG. 7, but other scan methods may also be used. For example, a plurality of rows to be read may be scanned in parallel.

However, it is not preferable to perform the scans A and B at the same time, because control becomes complicated. Therefore, when an exposure time is differentiated, it is preferable to select the first scan of, for example, the scan A, having a long storage time, so as not to overlap the last scan of the scan B. This is also same to the case of the scan B.

Figure 8:
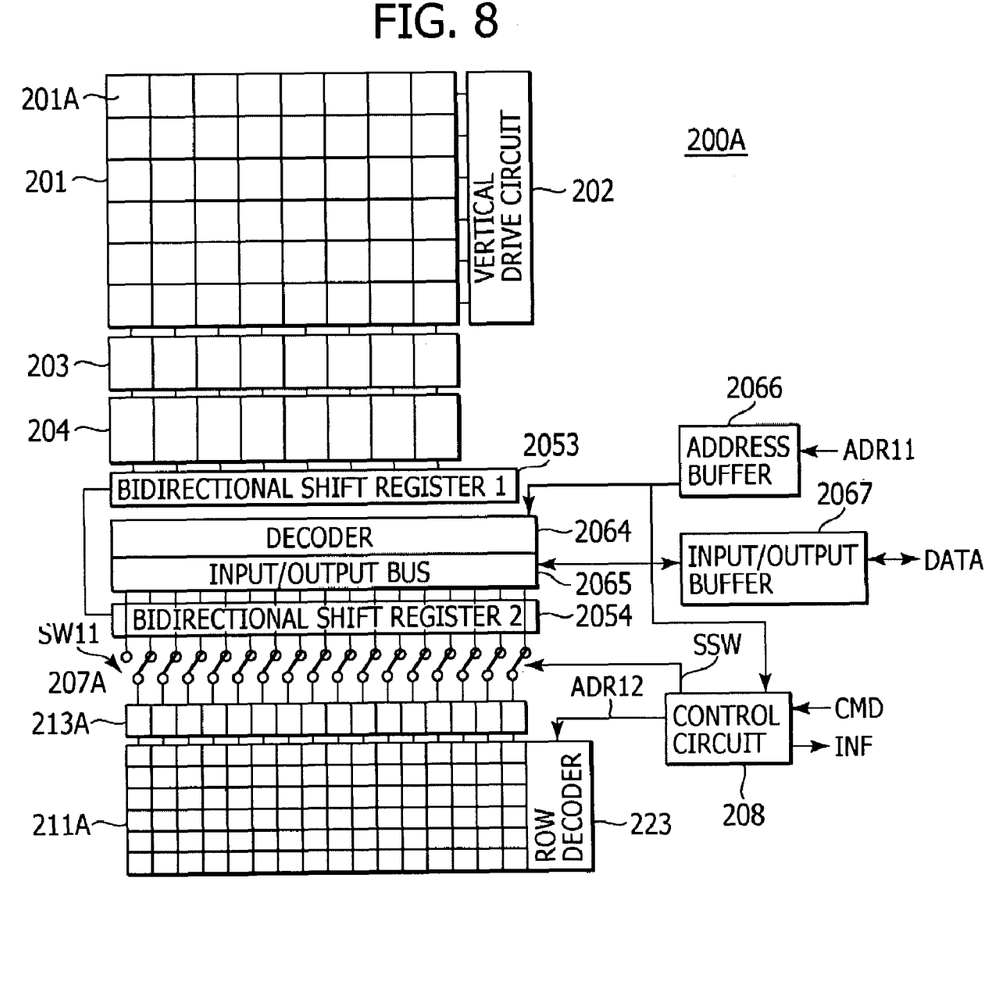
FIG. 8 is a diagram showing another example of the structure of a CMOS image sensor (solid state image pickup device) according to an embodiment of the present invention.

FIG. 8 is a diagram showing another structure of a CMOS image sensor (solid state image pickup device) according to an embodiment of the present invention.

In a CMOS image sensor 200A shown in FIG. 8, an internal interface 205A has a first bidirectional shift register 2503 and a second bidirectional shift register 2054.

An external interface 206A has a decoder 2064, an input/output bus 2065, an address buffer 2066 and an input/output buffer 2067.

A frame memory unit 112A has a single memory cell array 211A having a plurality of memory cells arranged in a matrix shape, and corresponding sense amplifiers 213A and a row decoder 223.

A connection switching circuit 207A has a switch group SW11 for selectively connecting each column of the memory cell array 211A and the input/output bus 2065 or second bidirectional shift register 2054.

In the example shown in FIG. 8, odd number columns of the memory cell array 211A are connected to the second bidirectional shift register 2054, and even number columns are connected to the input/output bus 2065.

Namely, the odd number columns of the memory cell array 211A operate to transfer data to/from the calculation circuit 204 to form an image, and the even number columns operate to read/write data to/from the external.

Both the operations share the row decoder 223. The decoder 2064 of the external interface 206A is supplied with an address ADR11 from the external to connect the sense amplifier 213A of the address ADR 11 to the input/output buffer 2067.

The row decoder 223 of the memory receives an address ADR12 from the control circuit 208. This address ADR12 is supplied from the control circuit 208 which selects either the address ADR11 externally inputted and moved once to the control circuit 208 or result obtained by a row address of the memory to be read to the sense amplifier 213 being calculated by the control circuit 208.

The first bidirectional shift register 2053 is formed at a pixel pitch, and the second bidirectional shift register 2054 is formed at a pitch twice of that of the memory cells. Data is exchanged by connecting the first and second bidirectional shift registers to adjust the pitches.

As another example of FIGS. 4 and 6, each of the first frame memory area (A) 211 and second frame memory area (B) 212 may have image data larger than image data of one image, if the data capacity is reduced.

For example, process may be leaving image corresponding to two images data in the first frame memory area (A) 211 while scanning pixels four times.

For example, if scan is performed four times by changing an exposure time in order to expand a dynamic range, although optimum exposure times is either one of them with respect to each pixel, signals of two scans among four scans may be left as a margin for connecting the pixel to adjacent pixels having a different optimum exposure time.

Further, the following operation may be adopted. Without writing the data read from the memory and calculated by the calculation circuit 204 back to the memory, the calculation circuit 204 may perform only black level correction and does not read data from the memory, but only stores the data in the memory together with a signal indicating the read number, only when signals from the pixels enter a proper range.

Figure 9:
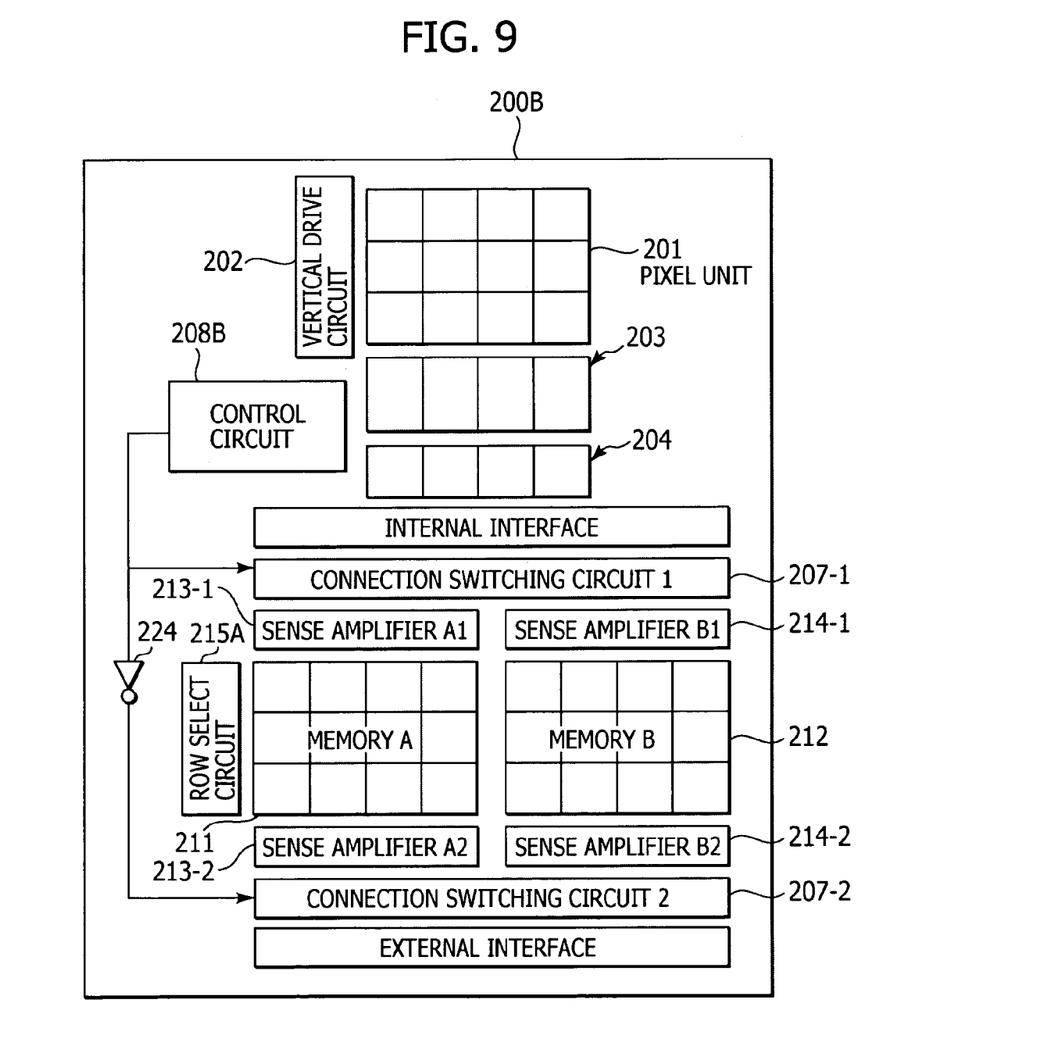
FIG. 9 is a diagram showing still another example of the structure of a CMOS image sensor (solid state image pickup device) according to an embodiment of the present invention.

FIG. 9 is a diagram showing still another structure of a CMOS image sensor (solid state image pickup device) according to an embodiment of the present invention.

Different points of a CMOS image sensor 200B shown in FIG. 9 from the CMOS image sensor 200 shown in FIGS. 4 and 6 reside in that two connection switching circuits 207-1 and 207-2 are arranged by sandwiching a frame memory unit 112B and that sense amplifiers of the frame memory unit 112B are provided in correspondence with the connection switching circuits 207-1 and 207-2, respectively.

In FIG. 9, sense amplifiers 213-1 and 213-2 are provided for the first frame memory area (A), and sense amplifiers 214-1 and 214-2 are provided for the second frame memory area (B).

A control signal S208 of a control circuit 208B is supplied directly to the first connection switching circuit 207-1, and supplied via an inverter 224 to the second connection switching circuit 207-2.

Namely, in the example shown in FIG. 9, there may be provided the sense amplifiers 213-1 and 214-1 for an internal interface 205 and the sense amplifiers 213-2 and 214-2 for an external interface 206, and it is possible to adopt the structure that either one of the sense amplifiers is operated and the others are disconnected by the connection switching circuits 207-1 and 207-2.

Figure 10:
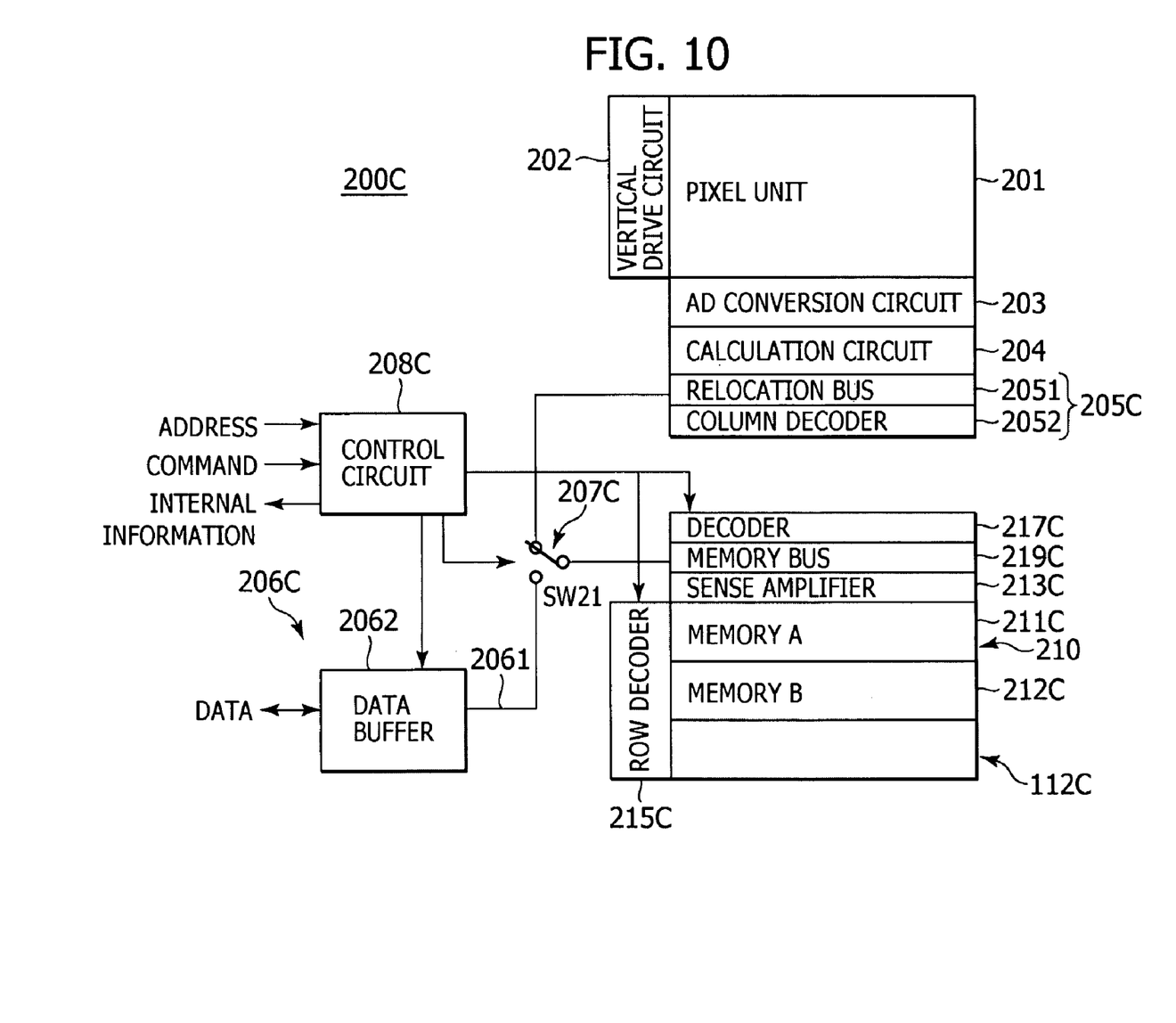
FIG. 10 is a diagram showing still another example of the structure of a CMOS image sensor (solid state image pickup device) according to an embodiment of the present invention.

FIG. 10 is a diagram showing still another structure of a CMOS image sensor (solid state image pickup device) according to an embodiment of the present invention.

Figure 11:
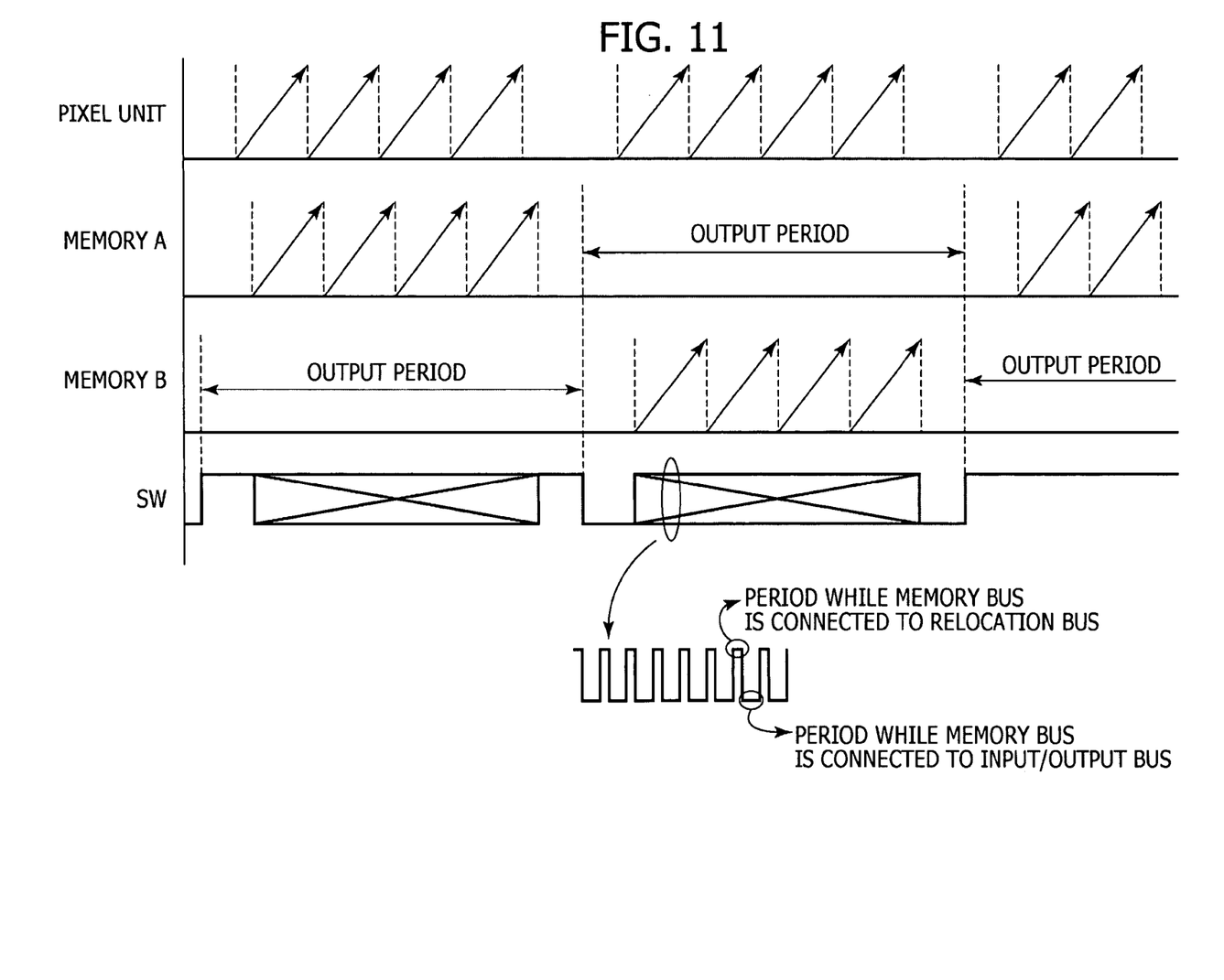
FIG. 11 is a diagram illustrating an operation state of the CMOS image sensor shown in FIG. 10.

FIG. 11 is a diagram illustrating an operation state of the CMOS image sensor shown in FIG. 10.

In the CMOS image sensor 200C, instead of constituting memory area by physically separating the memories such as those shown in FIGS. 4 and 6, memory areas (A) 211C and (B) 212C are assigned on one memory 210.

An internal interface 205C has a relocation bus 2051 and a column decoder 2052.

An external interface 206C has an input/output bus 2061 and a data buffer 2062.

A switch SW21 of a switching unit is provided as a connection switching circuit 207C.

In this case, the frame memory unit 112C is connected to either one of the internal interface 205C and the external interface 206C at same timing.

However, as shown in FIG. 11, the frame memory may be connected to the external interface 206C in a normal state, and connection may be switched to the internal interface 205C only when necessary.

Accordingly, a frame memory unit can exchange data with both interfaces, during the same time period although not at the same timing.

The internal interface exchanges data in the unit of pixels of one row.

The assignment positions of the memory areas (A) and (B) may be changed in the middle of an operation.

A plurality of examples of the structures of the CMOS image sensor of the embodiments have been described above.

With respect to the CMOS image sensors, from the manufacturing point of views, it is difficult in some cases to manufacture image sensors and memories on the identical substrate. Therefore, for example, as shown in FIG. 12, the sensor and the memory may be preferably formed on different substrates IC1 and IC2 and then connected in the column unit basis.

Since a pitch is narrow if connected based on the column unit basis, the substrates are connected not by bonding but by micro bumps using micro PAD's.

Even if micro PAD is shared by two to sixteen columns, data can be sent at sufficiently low speed with respect to serial outputs by horizontally scanning 1000 columns or more.

Figure 12:
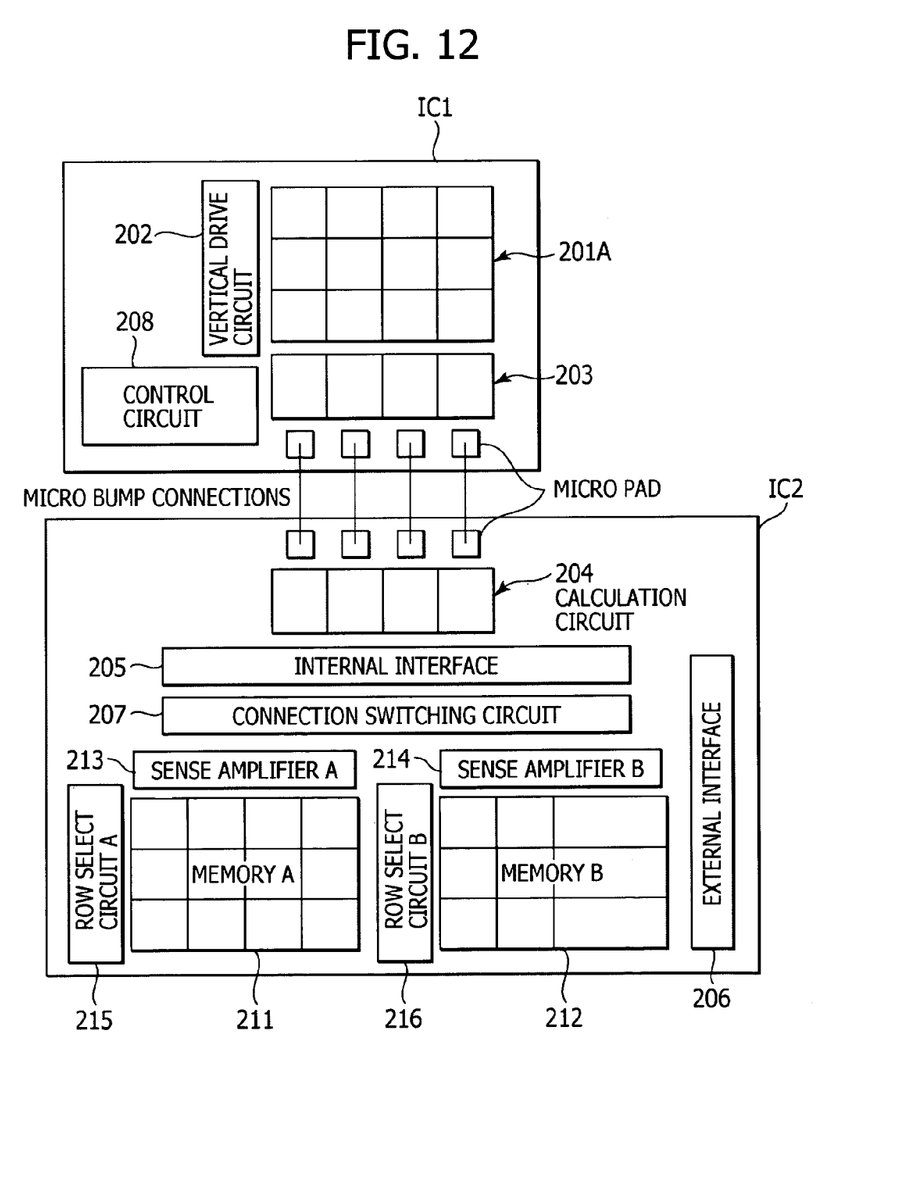
FIG. 12 is a diagram showing a layout of a sensor unit and a frame memory unit of a CMOS image sensor according to an embodiment.

A connection position is preferably a position after conversion into digital data, i.e., after the AD conversion circuit as shown in FIG. 12, and before the internal interface because the internal interface is desired to be on the memory side.

The memory unit may have an area not connected to the internal interface but always seemed as a general memory from the external.

Obviously, it is clear that three or more memories may be used cyclically.

As described above, according to the embodiment, the solid state image pickup device has a pixel unit 201 having a plurality of pixels 201A arranged in a two-dimensional matrix shape and having a mechanism for converting an optical signal into an electrical signal and accumulating the electrical signal in accordance with an exposure time, an AD conversion circuit 203 for AD converting a signal outputted from the pixel unit 201, a calculating circuit 204 for calculating an AD conversion result, a frame memory unit 112, an internal interface 205 for connecting the calculating circuit 204 and the frame memory unit 112, an external interface 206 for connecting an external and the frame memory unit 112, and a connection switching circuit 207 for switching a connection of the frame memory unit 112 relative to the internal interface 205 and the external interface 206. The frame memory unit 112 is divided into a plurality of areas, and while the pixel unit 201 is scanned a plurality of times image data having a reduced data size is recorded in a partial area A of the frame memory unit 112 via the internal interface 205, and during the same time period, data in another area (e.g., memory area B) of the frame memory unit 112 is outputted via the external interface 206, and after a plurality of scanning is completed, similar operations are repeated by connecting the memory area B different from the memory area A of the frame memory unit 112 to the internal interface 205 and connecting an area (e.g., memory area A) other than the memory area B to the external interface 206. Accordingly, the following effects may be obtained.

Namely, a data output rate can be lowered in speed in case of moving images.

Processing at the succeeding stage IC can be made easy.

A low speed interface may be sufficient and cost can be reduced.

In parallel to data output, a new image may be generated from the pixel side, therefore the degree of operation freedom can be improved.

It should be understood by those skilled in the art that various modifications, combinations, sub-combinations and alterations may occur depending on design requirements and other factors insofar as they are within the scope of the appended claims or the equivalents thereof.

What is claimed is:

1. A solid state image pickup device comprising:
    a pixel unit having a plurality of pixels arranged in a two-dimensional matrix shape and having a mechanism for converting an optical signal into an electrical signal and outputting the resultant signal;
    a column processing circuit for performing column processing of the signal from the pixel unit;
    a calculating circuit for calculating a processing result of the column processing circuit;
    a frame memory unit;
    an internal interface for connecting the calculating circuit and the frame memory unit;
    an external interface for connecting an external device and the frame memory unit; and
    a connection switching circuit for switching a connection of the frame memory unit relative to the internal interface and the external interface,
    wherein,
        the column processing circuit includes an analog/digital (AD) conversion circuit for converting an analog signal into a digital signal,
        the frame memory unit is divided into a plurality of areas, and
        the solid state image pickup device further comprises a control unit for controlling in such a way that while the pixel unit is scanned a plurality of times, image data having a reduced data size is recorded in a first area of the frame memory unit via the internal interface, and during the same time period, data is outputted from another area of the frame memory unit via the external interface, and after a plurality of scans are completed, similar operations are repeated by connecting a second area different from the first area of the frame memory unit to the internal interface and connecting an area other than the second area to the external interface.

2. The solid state image pickup device according to claim 1, wherein the AD conversion circuit and the calculation circuit are arranged at a plurality of columns, and parallel processing is performed based on a row unit basis in accordance with scanning of the pixel unit.

3. The solid state image pickup device according to claim 2, further comprising an address circuit provided per each frame memory unit connected to the internal interface.

4. The solid state image pickup device according to claim 3, further comprising an input/output circuit provided per each frame memory unit.

5. The solid state image pickup device according to claim 2, wherein the calculation circuit calculates a signal read from the frame memory unit and a signal outputted from the AD conversion circuit, and a calculation result is again written in the frame memory unit.

6. The solid state image pickup device according to claim 1, wherein the control unit has a function of outputting a signal noticing in advance that connection is switched to the external, before connection switching.

7. A solid state image pickup device comprising:
    a pixel unit having a plurality of pixels arranged in a two-dimensional matrix shape and having a mechanism for converting an optical signal into an electrical signal and outputting the signal; and
    a frame memory unit,
    wherein,
        while an image data forming area of the frame memory is shifted, an operation is repeated by which while the pixel unit is scanned a plurality of times, image data is formed in a partial area of the frame memory, and during the same time period, image data previously formed is outputted from another partial area of the frame memory,
        the frame memory unit is divided into a plurality of areas, and
        the solid state image pickup device further comprises a control unit for controlling in such a way that while the pixel unit is scanned a plurality of times, image data having a reduced data size is recorded in a first area of the frame memory unit via the internal interface, and during the same time period, data is outputted from another area of the frame memory unit via the external interface, and after a plurality of scans are completed, similar operations are repeated by connecting a second area different from the first area of the frame memory unit to the internal interface and connecting an area other than the second area to the external interface.

8. A drive method for a solid state image pickup device, the solid state image pickup device comprising:
    a pixel unit having a plurality of pixels arranged in a two-dimensional matrix shape and having a mechanism for converting an optical signal into an electrical signal and outputting the signal;
    a column processing circuit for performing column processing on the signal from the pixel unit;
    a calculating circuit for calculating a processing result of the column processing circuit;
    a frame memory unit;
    an internal interface for connecting the calculating circuit and the frame memory unit;

an external interface for connecting an external and the frame memory unit; and a connection switching circuit for switching a connection of the frame memory unit relative to the internal interface and the external interface, wherein in the drive method for the solid state image pickup device, the frame memory unit is divided into a plurality of areas; and while the pixel unit is scanned a plurality of times, image data having a reduced data size is recorded in a first area of the frame memory unit via the internal interface, and during the same time period, data is outputted from another area of the frame memory unit via the external interface, and after scans by the plurality of times are completed, similar operations accompanied by the scans are repeated by connecting a second area different from the first area of the frame memory unit to the internal interface and connecting an area other than the second area to the external interface.

9. A camera system comprising:

a solid state image pickup device;

an optical system for forming an object image on the solid state image pickup device; and a signal processing circuit for processing an image signal output from the solid state image pickup device, wherein, the solid state image pickup devices includes (a) a pixel unit having a plurality of pixels arranged in a two-dimensional matrix shape and having a mechanism for converting an optical signal into an electrical signal and outputting the signal;

(b) a column processing circuit for performing column processing on the signal from the pixel unit;

(c) a calculating circuit for calculating a processing result by the column processing circuit;

(d) a frame memory unit;

(e) an internal interface for connecting the calculating circuit and the frame memory unit;

(f) an external interface for connecting an external device and the frame memory unit; and (g) a connection switching circuit for switching a connection of the frame memory unit relative to the internal interface and the external interface, and wherein, (i) the column processing circuit includes an analog/digital (AD) conversion circuit for converting an analog signal into a digital signal, (ii) the frame memory unit is divided into a plurality of areas, and (iii) the solid state image pickup device further comprises a control unit for controlling in such a way that while the pixel unit is scanned a plurality of times, image data having a reduced data size is recorded in a first area of the frame memory unit via the internal interface, and during the same time period, data is outputted from another area of the frame memory unit via the external interface, and after a plurality of scans are completed, similar operations are repeated by connecting a second area different from the first area of the frame memory unit to the internal interface and connecting an area other than the second area to the external interface.

* * * * *